US008228324B2

(12) United States Patent
Kimura et al.

(10) Patent No.: US 8,228,324 B2
(45) Date of Patent: Jul. 24, 2012

(54) DISPLAY APPARATUS HAVING PRECHARGE CAPABILITY

(75) Inventors: Naoya Kimura, Chiba (JP); Hiroyoshi Ichikura, Tokyo (JP)

(73) Assignee: Lapis Semiconductor Co., Ltd. (JP)

( * ) Notice: Subject to any disclaimer, the term of this patent is extended or adjusted under 35 U.S.C. 154(b) by 305 days.

(21) Appl. No.: 12/567,141

(22) Filed: Sep. 25, 2009

(65) Prior Publication Data

US 2010/0013826 A1 Jan. 21, 2010

Related U.S. Application Data

(62) Division of application No. 11/448,042, filed on Jun. 7, 2006, now Pat. No. 7,619,621.

(30) Foreign Application Priority Data

Jul. 14, 2005 (JP) ................................ 2005-205542

(51) Int. Cl.
*G06F 3/038* (2006.01)
*G09G 5/00* (2006.01)
*G09G 3/32* (2006.01)

(52) U.S. Cl. .............. 345/214; 345/82; 345/83; 345/87; 345/98; 345/100; 345/204; 345/211; 345/212

(58) Field of Classification Search .................... 345/55, 345/76, 77, 82, 83, 87, 98, 100, 204, 211, 345/212, 213, 214
See application file for complete search history.

(56) References Cited

U.S. PATENT DOCUMENTS

| | | | | |
|---|---|---|---|---|
| 6,204,834 | B1 | 3/2001 | Baker et al. | |
| 6,594,606 | B2 | 7/2003 | Everitt | |
| 6,744,417 | B2 | 6/2004 | Yamashita et al. | |
| 6,995,737 | B2 | 2/2006 | LeChevailier | |
| 7,292,234 | B2 | 11/2007 | Kitahara | |
| 7,463,229 | B2 | 12/2008 | Morita | |
| 7,576,718 | B2 * | 8/2009 | Miyazawa | 345/78 |
| 7,619,621 | B2 * | 11/2009 | Kimura et al. | 345/212 |
| 2005/0001795 | A1 | 1/2005 | Kitahara | |
| 2005/0078078 | A1 | 4/2005 | Morita | |
| 2005/0116902 | A1 * | 6/2005 | Miyzawa | 345/76 |
| 2006/0082528 | A1 * | 4/2006 | Guo et al. | 345/82 |

FOREIGN PATENT DOCUMENTS

JP 2005-037844 10/2005

* cited by examiner

*Primary Examiner* — My-Chau T Tran
(74) *Attorney, Agent, or Firm* — Studebaker & Brackett PC; Donald R. Studebaker

(57) ABSTRACT

A display includes capacitive display elements, output drivers, scan switches, precharge switches, and a precharge stopper. The drivers provide drive currents or voltages corresponding to display data, thereby driving the display elements correspondingly to the data. The precharge stopper determines whether display data corresponds to a specific state and prevents the display element from being precharged when the display data corresponds to the specific state.

6 Claims, 5 Drawing Sheets

60 ANODE LINE DRIVE CIRCUIT
VDDH
C1
C2
CN
61-1
61-2
61-N
P1
P2
PN
62-1
62-2
62-N
63-1
63-2
63-N
50 DISPLAY PANEL
51-1
51-2
51-N
52-1
52-2
52-M
53-11
53-12
53-1N
53-21
53-22
53-2N
53-M1
53-M2
53-MN
70 CATHODE LINE SCAN CIRCUIT
71-1
71-2
71-M
R1
R2
RM
VSSH
80 DISPLAY CONTROL CIRCUIT
C1~CN
P1~PN
R1~RN
DRIVER CONTROL UNIT
DISPLAY DATA LATCH
PRECHARGE LATCH
SHIFT REGISTER
N
N+1
N+2
CLK
COMPARATOR
DA
81
82
83
84
85
86

DISPLAY APPARATUS HAVING PRECHARGE CAPABILITY

BACKGROUND OF THE INVENTION

1. Field of the Invention

The present invention relates to a display apparatus including a display panel in which a variety of display elements, which are light emitting elements such as organic electroluminescent (EL) elements, are driven to emit light, and more particularly to a display apparatus using a precharge method in which display elements are precharged with an electrical charge before being driven to emit light, thereby increasing the response speed.

2. Description of the Related Art

Examples of a display apparatus including organic electroluminescent (EL) elements that are driven to emit light are described in Japanese Unexamined Patent Publication Kokai Nos. 9-232074 (see, for example, FIGS. 9 to 12) and 2005-18038 (see, for example, FIG. 1).

FIG. 5 schematically illustrates a conventional organic EL display, for example, described in the above-described Japanese unexamined patent publications.

The organic EL display shown in FIG. 5 is a passive matrix organic EL display, which employs a cathode line scan/anode line drive method, and includes a display panel 10, an anode line drive circuit 20 which drives anode lines, a cathode line scan circuit 30 which scans cathode lines, and a display control circuit 40 which controls the anode line drive circuit 20 and the cathode line scan circuit 30.

The display panel 10 includes a plurality of anode lines 11-1 to 11-N and a plurality of cathode lines 12-1 to 12-M, which are arranged in matrix form, and a plurality of display elements 13-11 to 13-MN, each including an organic EL element, which are arranged respectively at intersections between the anode lines 11-1 to 11-N and the cathode lines 12-1 to 12-M and each of which is connected between a corresponding one of the anode lines 11-1 to 11-N and a corresponding one of the cathode lines 12-1 to 12-M. Each of the display elements 13-11 to 13-MN including an organic EL element which is a current injection type light emitting diode wherein electrons and holes are injected through corresponding electrodes and are then recombined in an organic material, thereby emitting light. Each of the display elements 13-11 to 13-MN includes an organic light emitter and has a capacitance between the anode and cathode.

The anode line drive circuit 20, which drives the anode lines 11-1 to 11-N, is connected to the anode lines 11-1 to 11-N. The anode line drive circuit 20 includes a plurality of series circuits and a plurality of precharge switches 23-1 to 23-N which are connected in parallel respectively with the plurality of series circuits. The plurality of series circuits includes constant current circuits 21-1 to 21-N and output drivers 22-1 to 22-N connected in series between a power supply voltage (VDDH) node and the anode lines 11-1 to 11-N, respectively. The constant current circuits 21-1 to 21-N are turned on/off according to drive control signals C1 to CN having specific pulse widths and output constant currents when they are on. The precharge switches 23-1 to 23-N are turned on/off according to precharge control signals P1 to PN having specific pulse widths. The precharge switches 23-1 to 23-N allow the display elements 13-11 to 13-MN to be precharged by the power supply voltage VDDH when they are on. When a constant current or voltage is applied to the display elements 13-11 to 13-MN, each including an organic EL element, the luminance of the display elements slowly rises (i.e., increases at a low rate) to a target level since the display element has capacitance. Particularly when pulse width modulation (PWM) control is performed, the capacitance of the display elements 13-11 to 13-MN causes inaccurate pulse widths to be applied to the display elements. In actual driving of the display elements 13-11 to 13-MN, the slow rise in the luminance is avoided by previously charging the display elements 13-11 to 13-MN, each having capacitance, with an electrical charge received through the precharge switches 23-1 to 23-N, i.e., by charging the display elements 13-11 to 13-MN to a voltage lower than a light emitting threshold voltage.

The cathode line scan circuit 30, which sequentially scans the plurality of cathode lines 12-1 to 12-M, is connected to the plurality of cathode lines 12-1 to 12-M. The cathode line scan circuit 30 includes a plurality of scan switches 31-1 to 31-M connected respectively to the cathode lines 12-1 to 12-M. The scan switches 31-1 to 31-M are sequentially switched according to scan control signals R1 to RM having specific pulse widths. To cause corresponding ones of the display elements 13-11 to 13-MN to emit light, each of the scan switches 31-1 to 31-M is switched to a ground potential node VSSH to connect a corresponding one of the cathode lines 12-1 to 12-M to the ground potential node VSSH. To prevent corresponding ones of the display elements 13-11 to 13-MN from emitting light, each of the scan switches 31-1 to 31-M is switched to the power supply voltage node VDDH to connect a corresponding one of the cathode lines 12-1 to 12-M to the power supply voltage node VDDH.

The display control circuit 40 outputs control signals C1 to CN, P1 to PN, and R1 to RM for controlling the anode line drive circuit 20 and the cathode line scan circuit 30. The display control circuit 40 includes a shift register 41, a display data latch circuit 42, and a driver control unit 43. According to a clock signal CLK, the shift register 41 receives serial display data DA, which determines gray or luminance gradation levels for display, and converts the received serial display data to parallel display data and outputs it to the display data latch circuit 42. The display data latch circuit 42 stores the parallel display data output from the shift register 41 and outputs the stored parallel display data to the driver control unit 43. The driver control unit 43 outputs control signals C1 to CN, P1 to PN, and R1 to RM at specific times based on the parallel display data output from the display data latch circuit 42.

FIGS. 6A and 6B are graphs each illustrating a driving waveform for driving a display element (for example, 13-22). FIG. 6A illustrates a waveform when driving the display element at a low brightness level or gray scale (for example, black). FIG. 6B illustrates a waveform when driving the display element at a high brightness level (for example, white). A description will now be given of how the display element 13-22 is driven to emit light.

When the time to change the scan target to the cathode line 12-2 is reached while the cathode line 12-1 is scanned with the scan switch 31-1 switched to the ground potential VSSH according to the control signal R1, first, the scan switch 31-2 is switched to the ground potential VSSH according to the control signal R2 and the precharge switch 23-2 is turned on according to the control signal P2 at the same time. This causes a power supply current to flow via a route (power supply voltage VDDH->precharge switch 23-2->anode line 11-2->display element 13-22->cathode line 12-2->scan switch 31-2->ground VSSH), thereby precharging the display element 13-22.

Then, the precharge switch 23-2 is turned off according to the control signal P2 and the constant current circuit 21-2 is turned on according to the control signal C2. The control signal C2 has a pulse width corresponding to display data DA.

When the display element 13-22 is driven to emit light of the lowest gray level (i.e., black) as shown in FIG. 6A, the pulse width of the control signal C2 is zero, so that the constant current circuit 21-2 is actually turned off rather than turned on. Accordingly, the display element 13-22 is activated by the ground potential VSSH. Specifically, an electrical charge, with which the display element 13-22 is precharged, is discharged to the ground potential node VSSH via the scan switch 31-2, so that the display element 13-22 is prevented from emitting light, thus displaying black.

On the other hand, when the display element 13-22 is driven to emit light of a high gray level (for example, white) as shown in FIG. 6B, the pulse width of the control signal C2 is large, so that the constant current circuit 21-2 outputs a constant current according to the power supply voltage VDDH during a period of time corresponding to the pulse width and the output driver 23-1 drives and provides the constant current to the display element 13-22. This causes the display element 13-22 to emit light, thus displaying white. When the pulse width period is completed, the constant current circuit 21-2 is turned off and an electrical charge stored in the display element 13-22 is discharged to the ground potential node VSSH via the scan switch 31-2, so that the display element 13-22 is prevented from emitting light, thus displaying black.

However, the conventional display has the following problems. To ensure that the luminance of the display elements 13-11 to 13-MN rapidly rises, they are precharged to the power supply voltage VDDH before they are driven by the constant current circuits 21-1 to 21-N and the output drivers 22-1 to 22-N. The display elements 13-11 to 13-MN, each having a capacitance, are precharged with an electrical charge, regardless of the gray level for display. When each of the display elements 13-11 to 13-MN is driven to display data of a low gray level, an electrical charge, with which the display element has been precharged, is not immediately removed from the display element, thus failing to display a clean low gray level.

More specifically, in FIGS. 6A and 6B, first, the precharge switch 23-2 is turned on to precharge the display element 13-22 to the power supply voltage VDDH. Even after the precharge switch 23-2 is turned off, an electrical charge remains in the display element 13-22 to apply the power supply voltage VDDH to the display element 13-22 during the period in which the drive circuit including the constant current circuit 21-2 and the output driver 22-2 is turned on. In the case where the display element 13-22 is driven to emit light at a high gray level as shown in FIG. 6B, the voltage applied to the display element 13-22 drops to the ground potential VSSH after it is driven by the power supply voltage VDDH for a certain period of time. On the other hand, in the case where the display element 13-22 is driven to emit light at a gray level of "0" as shown in FIG. 6A, it is necessary that the voltage applied to the display element 13-22 immediately drop to the ground potential VSSH. However, when it is driven to emit light at a gray level of "0" as shown in FIG. 6A, it takes a certain time to discharge the display element 13-22 to the ground potential VSSH since it has been precharged by the power supply voltage VDDH. Until the display element 13-22 is completely discharged to the ground potential VSSH, a voltage is still applied to the display element 13-22, so that it emits a glimmer of light, thus failing to display a clean gray level "0".

In addition, the superfluous precharging leads to unnecessary current consumption.

SUMMARY OF THE INVENTION

Accordingly, the present invention is directed to a display apparatus which substantially obviates one or more problems due to limitations and disadvantages of the related art.

In accordance with one aspect of the present invention, the above and other objects can be accomplished by the provision of a display apparatus including a plurality of display elements, each having a capacitance, wherein a drive current or voltage according to display data is provided to each one of the plurality of display elements after the display elements are precharged, thereby causing the display elements to emit light of a luminance corresponding to the display data, the display apparatus comprising a precharge stopper which prevents a display element from being precharged when the display data supplied to the display element corresponds to a specific state.

In accordance with another aspect of the present invention, there is provided a display apparatus, which comprises a plurality of display elements provided between a first electrode and a second electrode, each of the plurality of display elements having a capacitance; an output driver which provides a drive current or voltage having a first pulse width corresponding to display data to the first electrode of each of the display elements, thereby driving the display element to emit light; a plurality of scan switches which connect the second electrodes of the display elements driven by the output driver to a fixed potential node, the plurality of scan switches being scanned in response to the display data; a precharge driver which precharges the display element via the first electrode of the display element before the output driver drives the display element to emit light; and a precharge stopper which determines whether or not the display data corresponds to a specific state and prevents the precharge driver from precharging the display element when the display data corresponds to the specific state.

In accordance with another aspect of the present invention, there is provided a display apparatus having a plurality of capacitive display elements, a precharge section for precharging the capacitive display elements, a data driver for supplying a driving signal to each of the capacitive display elements to emit light of a luminance indicated by the display data, the data driving signal corresponding to the display data, the display apparatus comprising a determination section which determines whether or not the luminance indicated by the display data is less than a predetermined luminance; and a precharge prohibiting section which prohibits precharge of a capacitive display element driven by the driving signal of the display data indicating a luminance less than the predetermined luminance.

In accordance with yet another aspect of the present invention, there is provided a display apparatus, which comprises a plurality of display elements provided between a first electrode and a second electrode, each of the plurality of display elements having a capacitance; an output driver which provides a drive current or voltage having a first pulse width corresponding to display data to the first electrode of each of the display elements, thereby driving the display element to emit light; a plurality of scan switches which connect the second electrodes of the display elements driven by the output driver to a fixed potential node, the plurality of scan switches being scanned in response to the display data; a precharge driver which precharges the display element via the first electrode of the display element before the output driver drives the display element to emit light; and a precharge stopper which determines whether the display data corresponds to a partial display region or a partial non-display region and prevents the precharge driver from precharging the display element when the display data corresponds to the partial non-display region.

In the aspects of the present invention, the display apparatus includes the precharge stopper, which determines whether or not the display data corresponds to the specific state. This removes superfluous precharging, thereby clearly displaying low luminance display data and also reducing current consumption.

Additionally, in the aspect of the present invention, the display includes the precharge stopper, which determines whether the display data corresponds to the partial display region or the partial non-display region. This removes superfluous precharging of the partial non-display region, thereby reducing both the circuit size and the current consumption.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

A display apparatus according to the best mode of the present invention includes a plurality of display elements (for example, light emitting elements), each having a capacitance between a first electrode and a second electrode; an output driver which provides a drive current or voltage having a first pulse width corresponding to display data to the first electrode of each of the display elements, thereby driving the display element to emit light; a plurality of scan switches, each being scanned in response to the display data to connect the second electrode of the display element, driven by the output driver, to a fixed potential node; a precharge driver which precharges the display element via the first electrode of the display element before the output driver drives the display element to emit light; and a precharge stopper which determines whether or not the display data corresponds to a specific state and prevents or prohibits the precharge driver from precharging the display element when the display data corresponds to the specific state.

Preferably, the precharge stopper includes a comparator, which compares the display data with the specific state and outputs a determination as to whether or not the display data corresponds to the specific state, and a driver controller. The driver controller prevents the precharge driver from precharging the display element and causes the output driver to drive the display element to emit light when the determination of the comparator is that the display data corresponds to the specific state and causes the precharge driver to precharge the display element and then causes the output driver to drive the display element to emit light when the determination is that the display data does not correspond to the specific state.

[First Embodiment]

(Configuration of the First Embodiment)

Figure 1:
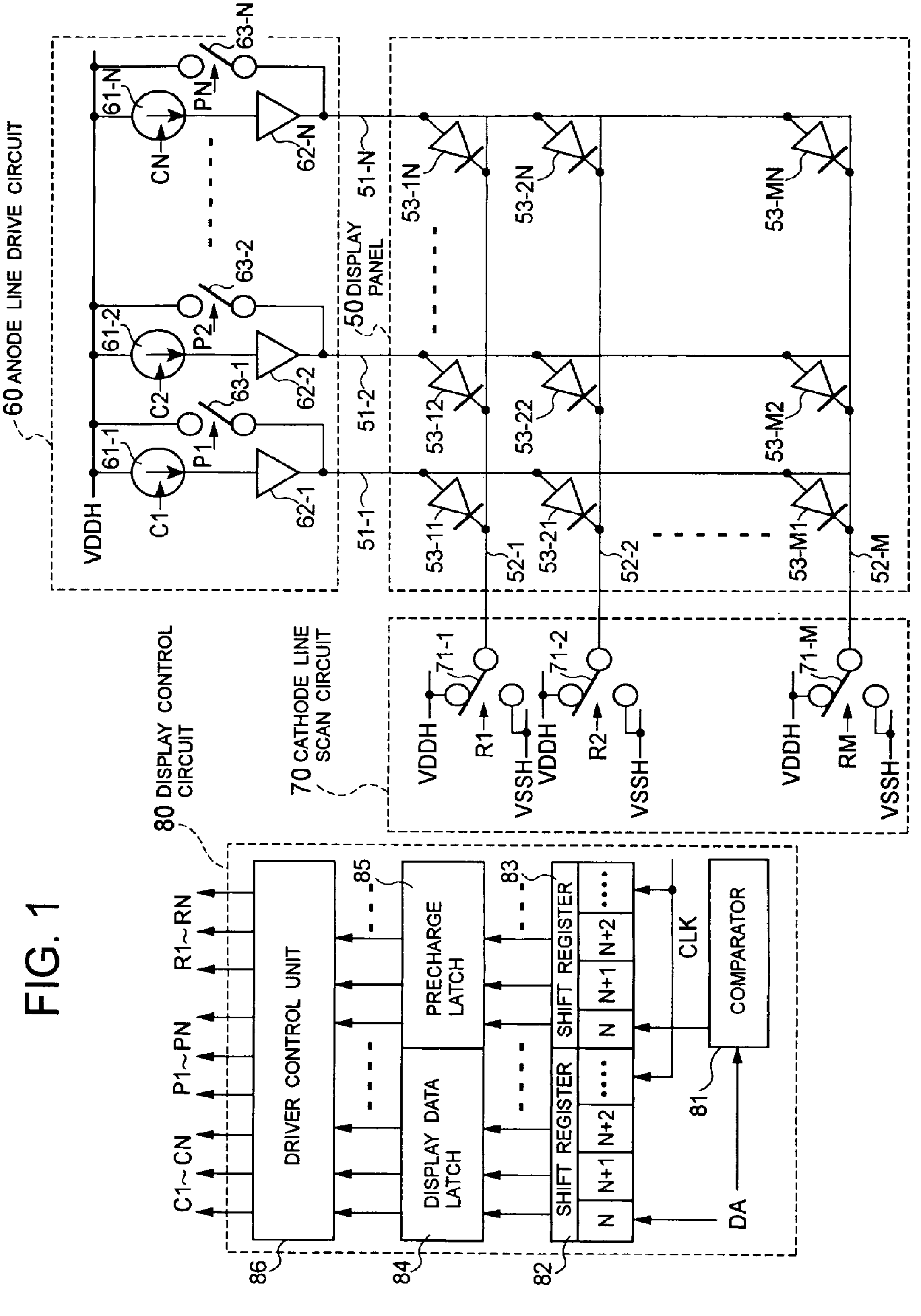
FIG. 1 schematically illustrates a display apparatus according to a first embodiment of the present invention.

FIG. 1 schematically illustrates a display apparatus (hereinafter, also simply referred to as a display) according to a first embodiment of the present invention.

Figure 5:
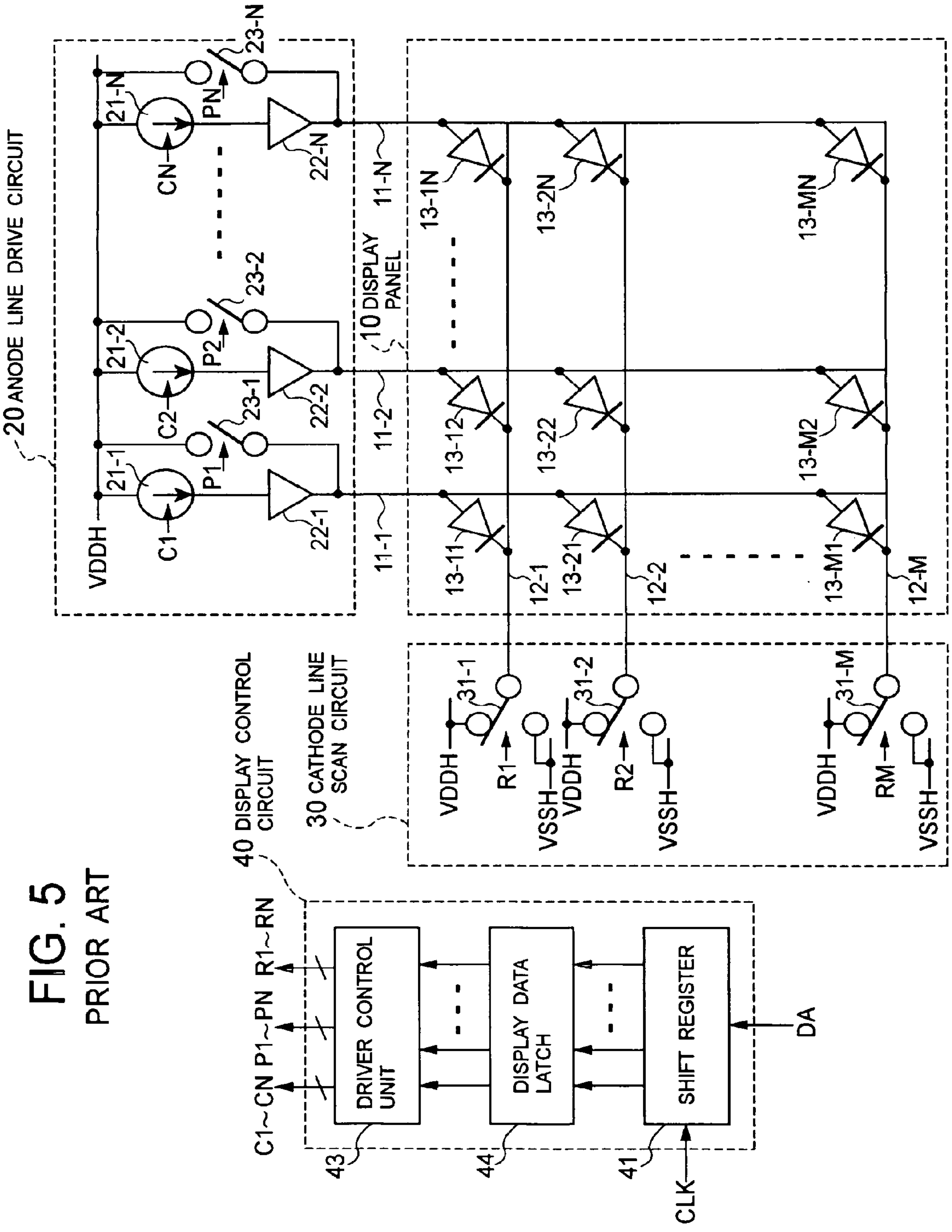
FIG. 5 PRIOR ART
FIG. 5 schematically illustrates a conventional organic EL display.
Figure 6A:
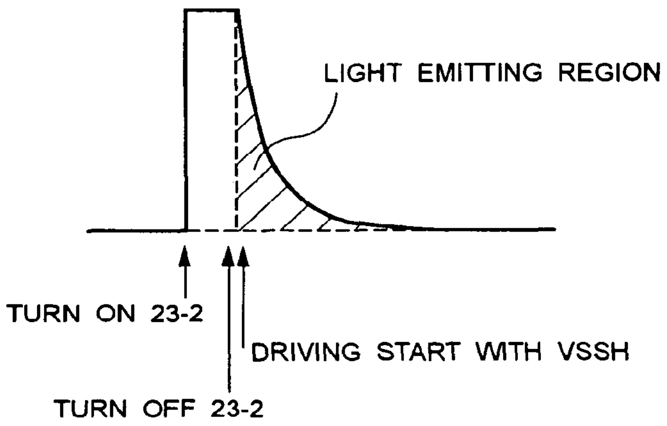
FIG. 6A PRIOR ART
FIGS. 6A and 6B are graphs illustrating waveforms when driving the display element.
Figure 6B:
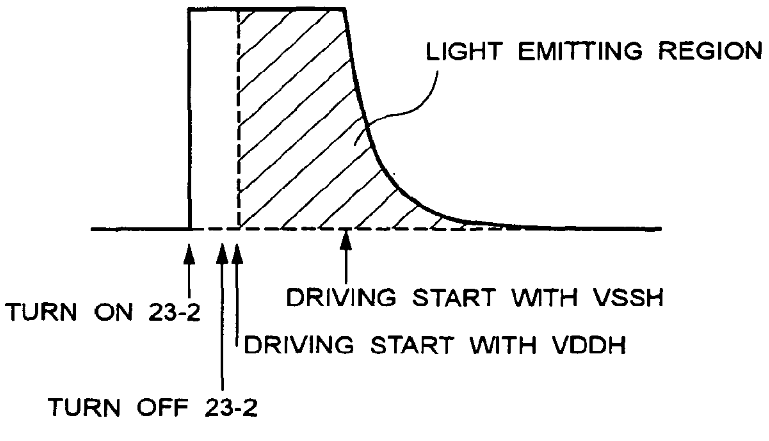
FIG. 6B PRIOR ART

Similar to that of FIG. 5, the display is, for example, a passive matrix organic EL display, which employs a cathode line scan/anode line drive method, and includes a display panel 50, an anode line drive circuit 60, a cathode line scan circuit 70, and a display control circuit 80 which controls the anode line drive circuit 60 and the cathode line scan circuit 70.

The display panel 50 includes a plurality of anode lines 51-1 to 51-N and a plurality of cathode lines 52-1 to 52-M, which are arranged in a matrix form, and a plurality of display elements 53-11 to 53-MN, each including an organic EL element as a light emitting element, which are arranged respectively at intersections between the anode lines 51-1 to 51-N and the cathode lines 52-1 to 52-M. The anodes of the display elements 53-11 to 53-MN are connected to the corresponding one of the anode lines 51-1 to 51-N and the cathodes of the display elements 53-11 to 53-MN are connected to the corresponding one of the cathode lines 52-1 to 52-M.

The anode line drive circuit 60, which drives the anode lines 51-1 to 51-N, is connected to the anode lines 51-1 to 51-N. The anode line drive circuit 60 includes a plurality of series circuits and a plurality of precharge switches 63-1 to 63-N which are connected in parallel respectively with the plurality of series circuits. The plurality of series circuits includes constant current circuits 61-1 to 61-N and output drivers 62-1 to 62-N connected in series between a power supply voltage (VDDH) node and the anode lines 51-1 to 51-N, respectively. The constant current circuits 61-1 to 61-N are turned on/off according to drive control signals C1 to CN having specific pulse widths and output constant currents when they are on. Each of the constant current circuits 61-1 to 61-N includes, for example, a transistor. The output drivers 62-1 to 62-N are circuits which drive and provide signals output from the constant current circuits 61-1 to 61-N to the anode lines 51-1 51-N. Each of the output drivers 62-1 to 62-N includes, for example, a transistor. The precharge switches 63-1 to 63-N are turned on/off according to precharge control signals P1 to PN having specific pulse widths. The precharge switches 63-1 to 63-N allow the display elements 53-11 to 53-MN to be precharged by the power supply voltage VDDH when they are on. Each of the precharge switches 63-1 to 63-N includes, for example, a switching transistor.

The cathode line scan circuit 70, which sequentially scans the plurality of cathode lines 52-1 to 52-M, is connected to the plurality of cathode lines 52-1 to 52-M. The cathode line scan circuit 70 includes a plurality of scan switches 71-1 to 71-M connected respectively to the cathode lines 52-1 to 52-M. The scan switches 71-1 to 71-M are sequentially switched according to scan control signals R1 to RM having specific pulse widths. Each of the scan switches 71-1 to 71-M includes, for example, a switching transistor. To cause corresponding ones of the display elements 53-11 to 53-MN to emit light, each of the scan switches 71-1 to 71-M is switched to a ground potential (VSSH) node to connect a corresponding one of the cathode lines 52-1 to 52-M to the ground potential node VSSH. To prevent corresponding ones of the display elements 53-11 to 53-MN from emitting light, each of the scan switches 71-1 to 71-M is switched to the power supply voltage (VDDH) node to connect a corresponding one of the cathode lines 52-1 to 52-M to the power supply voltage (VDDH) node.

The display control circuit 80 outputs control signals C1 to CN, P1 to PN, and R1 to RM for controlling the anode line drive circuit 60 and the cathode line scan circuit 70. The display control circuit 80 includes a comparator 81, an N-bit display data shift register 82, an N-bit precharge shift register 83, an N-bit display data latch circuit 84, an N-bit precharge latch circuit 85, and a driver control unit 86.

The comparator 81 receives serial display data DA, which determines gray levels or luminance gradation levels for display, and compares the display data DA with a specific state (for example, logic "0" representing gray level "0"), and then outputs a serial determination result as to whether or not the display data DA is identical to the specific state (for example, outputs a flag "1" when both are identical and a flag "0" when both are different). The output of the comparator 81 is connected to the precharge shift register 83. The display data shift register 82 sequentially receives serial display data DA according to a clock signal CLK, and converts it to N-bit parallel display data and outputs the N-bit parallel display data. Outputs of the display data shift register 82 are connected to the display data latch circuit 84. The precharge shift register 83 receives the serial determination result including flags "1" or "0" output from the comparator 81 according to the clock signal CLK and sequentially shifts the flags and then outputs a parallel determination result. Outputs of the precharge shift register 83 are connected to the precharge latch circuit 85.

The display data latch circuit 84 stores the N-bit parallel display data output from the display data shift register 82. Outputs of the display data latch circuit 84 are connected to the driver control unit 86. The precharge latch circuit 85 stores an N-bit parallel determination result output from the precharge shift register 83. Outputs of the precharge latch circuit 85 are connected to the driver control unit 86. The driver control unit 86 performs PWM (Pulse width Modulation) processing or the like based on the N-bit parallel display data output from the display data latch circuit 84 and the N-bit parallel determination result output from the precharge latch circuit 85 and outputs, at specific times, scan control signals R1 to RN having specific pulse widths, drive control signals C1 to CN having pulse widths corresponding to gray levels of the display data DA, and precharge control signals P1 to PN, each of which is disabled (for example, falls to "0") when it corresponds to the flag "1", to the scan switches 71-1 to 71-N, the constant current circuits 61-1 to 61-N, and the precharge switches 63-1 to 63-N.

Part of the driver control unit 86, the precharge shift register 83, and the precharge latch circuit 85 constitute a driver controller according to the present invention, and the driver controller and the comparator 81 constitute a precharge stopper or a precharge prohibiting portion according to the present invention.

(Operation of the First Embodiment)

Figure 2:
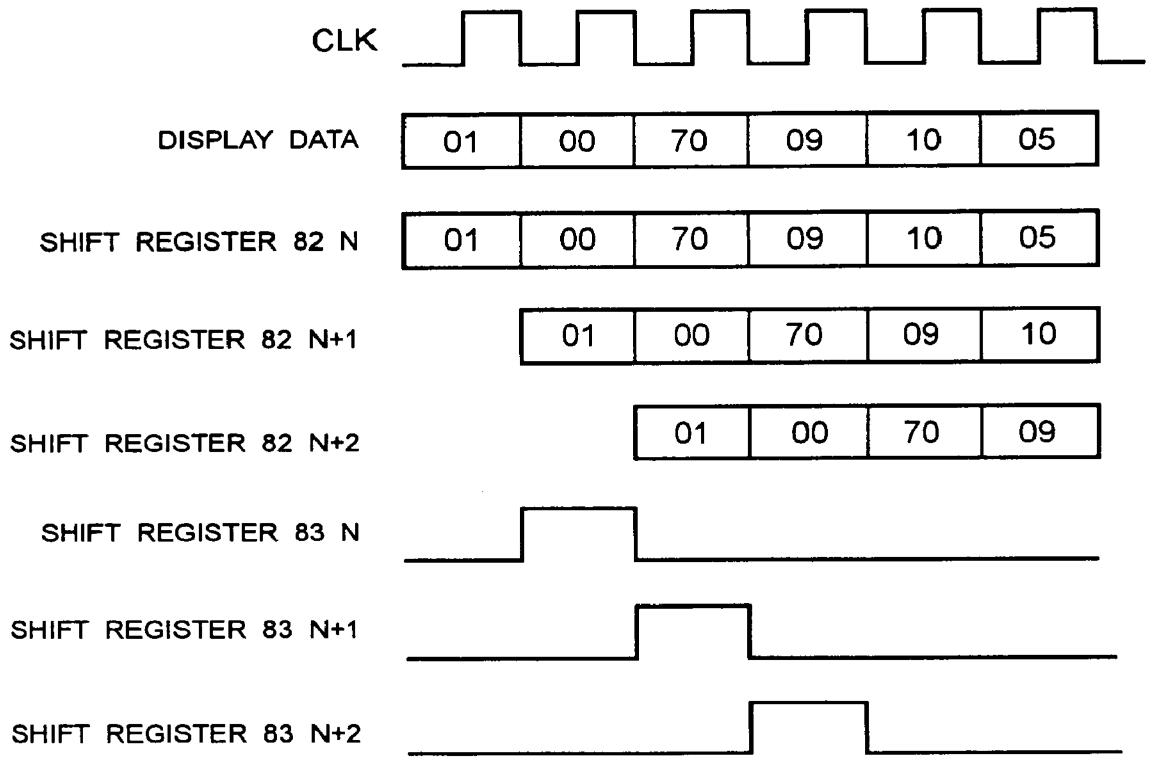
FIG. 2 is a timing chart illustrating how the display of FIG. 1 operates.

FIG. 2 is a timing chart illustrating how the display of the first embodiment operates.

First, the display data shift register 82 receives serial display data DA (for example, display data "01", "00", "70", "09", "10", and "05" in FIG. 2) and shifts the serial display data DA according to a clock signal CLK. At the same time, the comparator 81 compares the display data DA with the specific state and outputs a flag "1" to the precharge shift register 83 only when the display data DA is identical to gray level "0". Thus, the gray level "0" of the display data DA is paired with the flag "1".

When the shift register 82 has completely shifted all the display data DA, the shift register 82 outputs N-bit parallel display data, which is then stored in the display data latch circuit 84. At the same time, all N-bit parallel determination results including the flag "1" output from the precharge register 83 are stored in the precharge latch circuit 85. At the timing for performing precharging, the driver control unit 86 determines output values of the precharge latch circuit 85 and outputs corresponding precharge control signals P1 to PN which deactivate precharge switches (for example, 63-2, 63-3, 63-4, . . . ) corresponding to the output values "1" and activate precharge switches (for example, 63-1, 63-5, . . . ) corresponding to the output values "0". At the same time, the driver control unit 86 outputs a scan control signal (for example, R1). According to the scan control signal, a corresponding scan switch (for example, 71-1) is switched to the ground potential (VSSH) node and, according to the precharge control signals P1 to PN, only the precharge switches 63-1, 63-5, . . . corresponding to the output values "0" are turned on, so that the display elements 53-11, 53-15, . . . are precharged by the power supply voltage VDDH via the precharge switches 63-1, 63-5, . . . .

Then, at the timing when performing display, the driver control unit 86 outputs drive control signals C1 to CN to the constant current circuits 61-1 to 61-N, so that the constant current circuits 61-1 to 61-N operate according to the display data DA. The constant current circuits 61-1 to 61-N output constant currents and the output drivers 62-1 to 62-N drive and provide the constant currents to the display elements 53-11 to 53-1N, thereby emitting light of gray levels corresponding to the display data DA.

At the next timing when performing precharging, the driver control unit 86 outputs precharge control signals P1 to PN and outputs a scan control signal (for example, R2) in the same manner as described above. After the display elements (for example, 53-22, 53-24, . . . ) corresponding to the flags "0" are precharged, the driver control unit 86 outputs, at the timing of performing display, drive control signals C1 to CN to the constant current circuits 61-1 to 61-N. The constant current circuits 61-1 to 61-N and the output drivers 62-1 to 62-N cause the display elements 53-21 to 53-2N to emit light of gray levels corresponding to the display data DA.

(Advantage of the First Embodiment)

The comparator 81 determines whether or not the display data DA corresponds to a specific state so that the driver control unit 86 does not perform unnecessary precharging. This makes it possible to clearly display the gray level "0". Additionally, current consumption is also reduced by removing unnecessary precharging.

[Second Embodiment]

(Configuration of the Second Embodiment)

Figure 3:
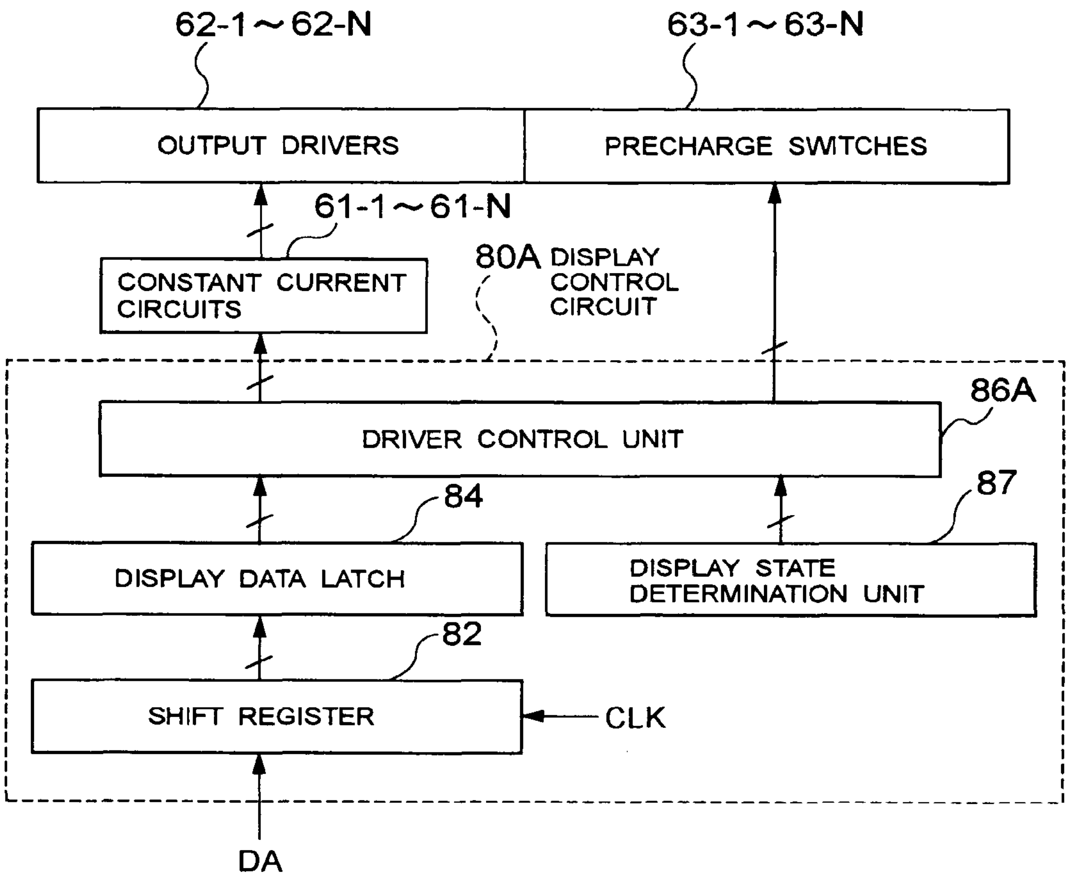
FIG. 3 schematically illustrates a display control circuit in a display apparatus according to a second embodiment of the present invention.
Figure 4:
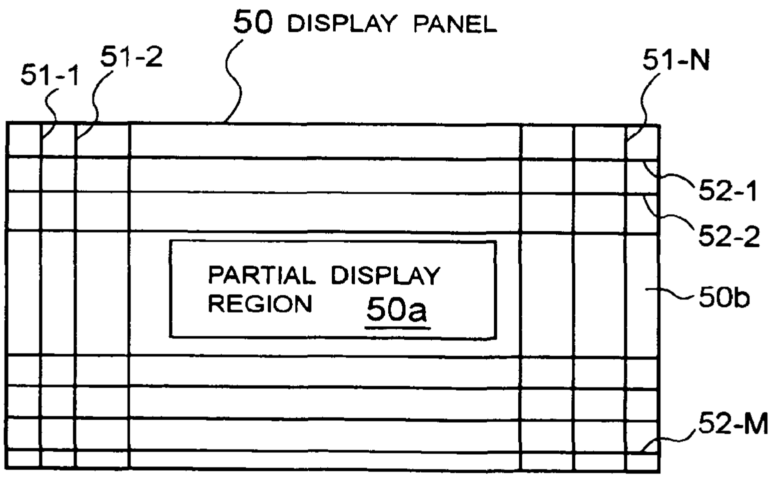
FIG. 4 schematically illustrates the display panel 50 shown in FIG. 1.

FIG. 3 schematically illustrates a display control circuit of a display according to a second embodiment of the present invention. In FIG. 3, elements similar to those of the first embodiment shown in FIG. 1 are denoted by similar reference numerals. FIG. 4 schematically illustrates the display panel 50 shown in FIG. 1.

In the embodiment, the display control circuit 80 in the display shown in FIG. 1 is replaced by a display control circuit 80A shown in FIG. 3. The following is the difference of the display control circuit 80A of FIG. 3 from the display control circuit 80 of FIG. 1. The display control circuit 80A includes a display state determinator (for example, a display state determination unit) 87, instead of the comparator 81 and the precharge shift register 83 of FIG. 1, and includes a driver control unit 86A having a different structure from the driver control unit 86.

When the display panel 50 operates in partial display mode, the display panel 50 performs display partially in part of the panel, i.e., a partial display region 50*a*, while display is not performed in a partial non-display region 50*b*, which is the remaining part of the panel, as shown in FIG. 4. In this case, the entirety of an anode line for display among the anode lines 51-1 to 51-N may be located in the partial non-display region 50*b* so that all display elements on the anode line located in the region 50*b* display black.

When the display panel 50 performs partial display, the display state determination unit 87 determines, using a comparator or the like, whether or not all display elements on a current anode line for display (one of the anode lines 51-1 to 51-N) are located in the partial non-display region 50*b*, based on a preset value or control signal from a register (not shown) associated with partial display information. When the determination is that the entirety of the anode line is located in the partial non-display region 50*b*, the display state determination unit 87 provides a precharge disable signal to the driver control unit 86A to forcibly disable the precharging of the display elements of the anode line. The driver control unit 86A performs PWM processing or the like based on N-bit parallel display data output from the display data latch circuit 84 and precharge disable signals output from the display state determination unit 87 and outputs, at specific timings, scan control signals R1 to RN having specific pulse widths, drive control signals C1 to CN having pulse widths corresponding to gray levels of the display data DA, and precharge control signals P1 to PN, each of which is disabled (for example, “0”) when it corresponds to the partial non-display region 50*b*, to the scan switches 71-1 to 71-N, the constant current circuits 61-1 to 61-N, and the precharge switches 63-1 to 63-N.

The display state determination unit 87 and a driver controller in the driver control unit 86A constitute a precharge stopper or a precharge prohibiting portion according to the present invention.

(Operation of the Second Embodiment)

In a partial display mode, the partial display information is preset in the display state determination unit 87 or is provided as a control signal to the display state determination unit 87.

The display data shift register 82 receives serial display data DA and shifts the serial display data DA according to a clock signal CLK. When the shift register 82 has completely shifted all the display data DA, the shift register 82 outputs N-bit parallel display data, which is then stored in the display data latch circuit 84. At the timing to perform precharging, the driver control unit 86A determines the contents of the precharge disable signals received from the display state determination unit 87 to output corresponding precharge control signals P1 to PN which deactivate ones of the precharge switches (63-1 to 63-N) corresponding to the partial non-display region 50*b* and activate the other ones of the precharge switches (63-1 to 63-N) corresponding to the partial display region 50*a*. At the same time, the driver control unit 86A outputs a scan control signal (for example, R1). According to the signals, a corresponding scan switch (for example, 71-1) is switched to the ground potential VSSH and only the precharge switches corresponding to the partial display region 50*a* are turned on, so that the corresponding display elements (53-11, 53-15, . . . ) are precharged by the power supply voltage VDDH via the precharge switches corresponding to the partial display region 50*a*.

Then, at the timing of performing display, the driver control unit 86A outputs drive control signals C1 to CN to the constant current circuits 61-1 to 61-N, so that the constant current circuits 61-1 to 61-N operate according to the display data DA. The constant current circuits 61-1 to 61-N output constant currents and the output drivers 62-1 to 62-N drive and provide the constant currents to the display elements 53-11, . . . , so that the partial display region 50*a* emits light of gray levels corresponding to the display data DA.

(Advantage of the Second Embodiment)

In the partial display mode, the entirety of an anode line for display among the anode lines 51-1 to 51-N may be located in the partial non-display region 50*b* so that all display elements of the anode line located in the region 50*b* display black. The display state determination unit 87 determines whether or not all display elements of a anode line for display are located in the partial non-display region 50*b*, and forcibly disables the precharging of the display elements of the anode line. This removes superfluous precharging, thereby reducing current consumption. This also removes the shift register 83 and the precharge latch circuit 85 in FIG. 1, thereby reducing the circuit size.

[Third Embodiment]

The present invention is not limited to the first and second embodiments and various modifications thereof are possible. The following modifications (1) to (6) can be provided according to a third embodiment of the present invention.

(1) In the first embodiment, the comparator 81 determines whether or not the display data DA is identical to gray level “0”. However, when the output drivers 22-1 to 22-N have a high driving capability or when low gray levels (for example, gray level “1” or “2”) cannot be displayed, the comparator 81 may determine whether or not the display data DA is lower than gray level “3”, thereby increasing the range of gray levels for which precharging is not performed.

(2) The display state determination unit 87 of FIG. 3 may be connected to the driver control unit 86 of FIG. 1 and the configuration of the driver control unit 86 may be altered so that it can also process the output of the display state determination unit 87, thereby achieving the same operations and advantages of the first and second embodiments.

(3) Although the first and second embodiments have been described with reference to the anode line drive circuit 60 which performs constant current driving using the constant current circuits 61-1 to 61-N, the present invention can also be applied to an anode line drive circuit which performs constant voltage driving using constant voltage circuits.

(4) In FIG. 1, reset switches which are controlled by the display control circuit may be connected between the anode lines 51-1 to 51-N and the ground potential VSSH node and the display control circuit may be configured to reset all the anode lines 51-1 to 51-N to the ground potential VSSH using all the reset switches before the scanning target changes from a cathode line (for example, 52-1) to a next one (for example, 52-2). This ensures that the luminance of the display elements rapidly falls, thereby achieving a higher scanning speed.

(5) Although the first and second embodiments have been described with reference to the precharge method, the present invention can also be applied to a cathode reset mode in which all the cathode lines 52-1 to 52-N are reset before the scanning target changes from a cathode line (for example, 52-1) to a next one (for example, 52-2). Also in this case, the present invention prevents current consumption due to overshoots that would otherwise occur when the cathode lines 52-1 to 52-N are switched to “H” after they are reset.

(6) Although the first and second embodiments have been described with reference to a cathode line scan/anode line drive method, the present invention can also be applied to an anode line scan/cathode line drive method. In addition, although the first and second embodiments have been described with reference to the display elements 53-11 to 53-MN which are organic EL elements, the present invention can also be applied to various other display elements such as light emitting elements, each having a capacitance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

This application is based on Japanese Patent Application No. 2005-205542 which is hereby incorporated by reference.

What is claimed is:

1. A display apparatus including a plurality of display elements, each having a capacitance, wherein a drive current or voltage according to display data is provided to each one of the plurality of display elements after the display elements are precharged, thereby causing the display elements to emit light of a luminance corresponding to the display data, the display apparatus comprising:

a precharge stopper which prevents a display element from being precharged when the display data supplied to the display element corresponds to a specific state, wherein the specific state is corresponding to non-emission state of the display element.

2. The display apparatus according to claim 1, wherein the precharge stopper includes a comparator which compares the display element corresponds to a specific state.

3. The display apparatus according to claim 1, wherein the display elements are organic electroluminescent (EL) elements.

4. A display apparatus including a plurality of display elements, each having a capacitance, wherein a drive current or voltage according to display data is provided to each one of the plurality of display elements after the display elements are precharged, thereby causing the display elements to emit light of a luminance corresponding to the display data, the display apparatus comprising:

a precharge stopper which prevents a display element from being precharged when the display data supplied to the display element corresponds to a specific state, and a non-display region discriminator which discriminates a partial non-display region of the display apparatus on the basis of partial display information, wherein the precharge stopper prevents precharging of the display elements included in the partial non-display region.

5. The display apparatus according to claim 4, wherein the display elements are organic electroluminescent (EL) elements.

6. The display apparatus according to claim 4, wherein the precharge stopper includes a comparator which compares the display element corresponds to a specific state.

* * * * *